April 23, 1957 H. B. COATS 2,789,893
FLUID FOGGING SYSTEM
Filed July 31, 1951 3 Sheets-Sheet 1
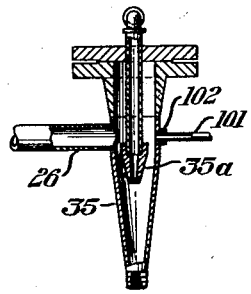
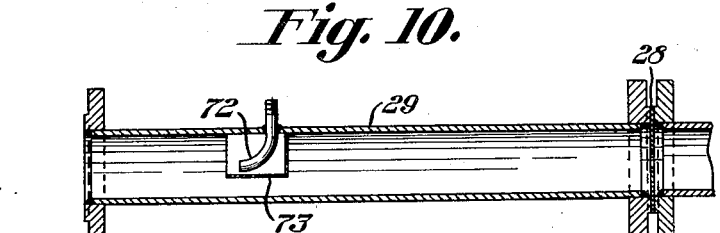
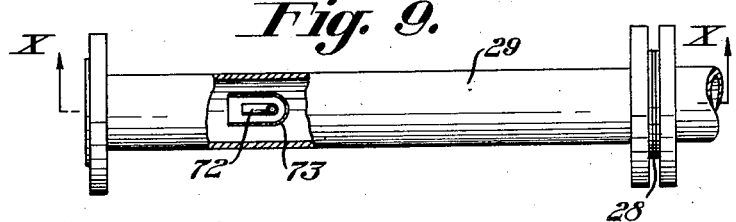
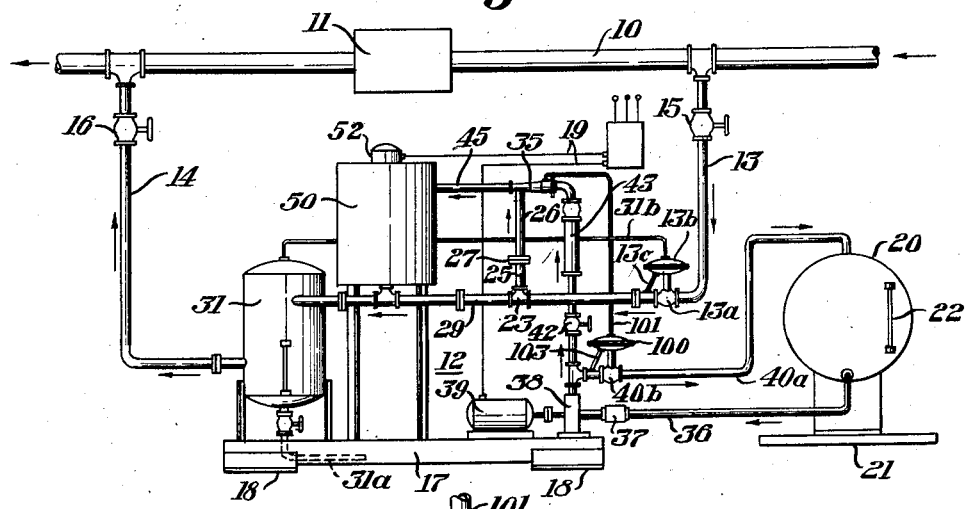
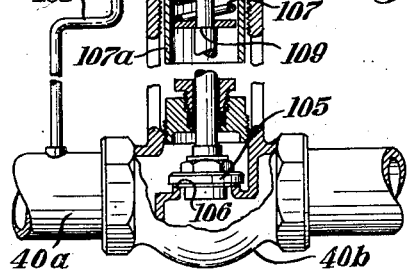
INVENTOR
Hal B. Coats April 23, 1957  H. B. COATS  2,789,893
FLUID FOGGING SYSTEM
Filed July 31, 1951  3 Sheets-Sheet 2
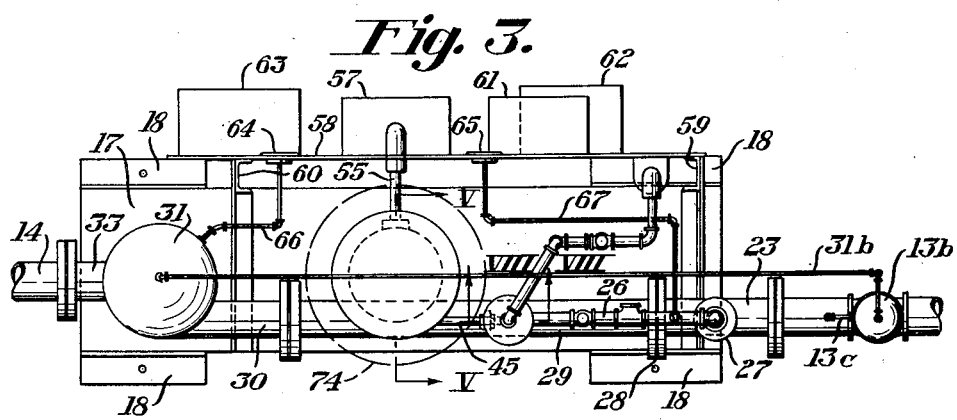
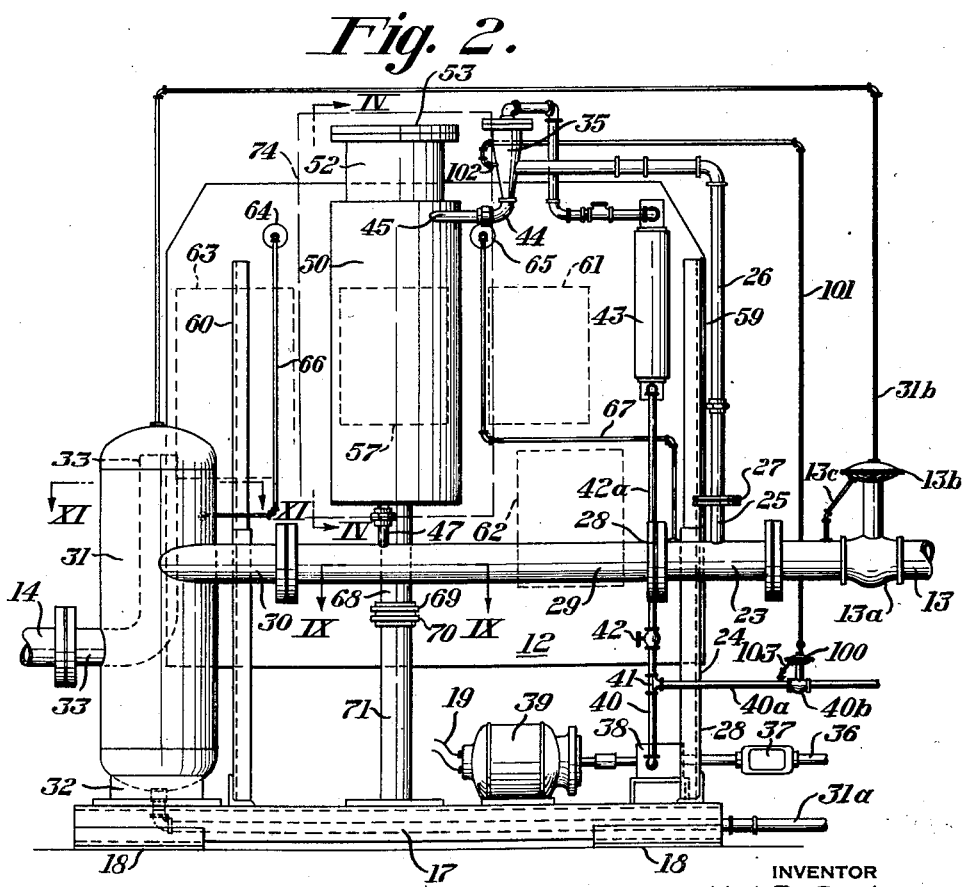
INVENTOR
Hal B. Coats
by Hoopes, Leonard & Glenn
his attorneys

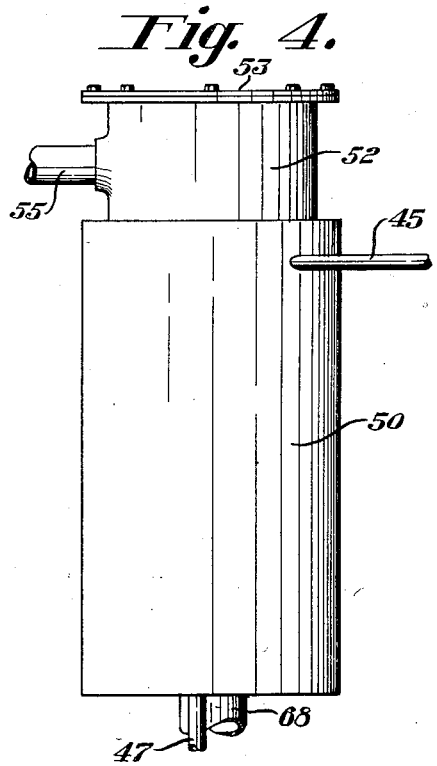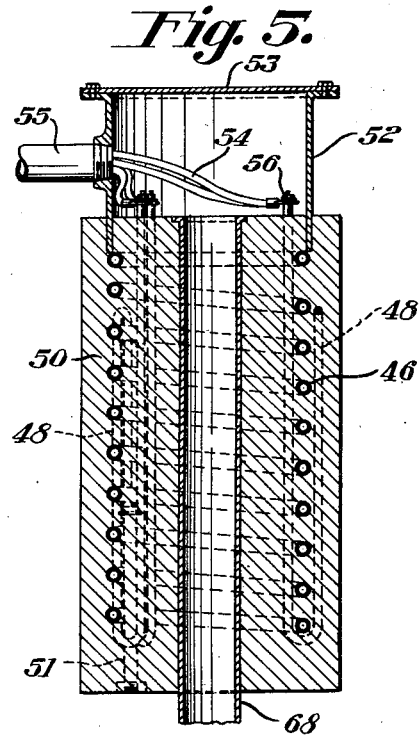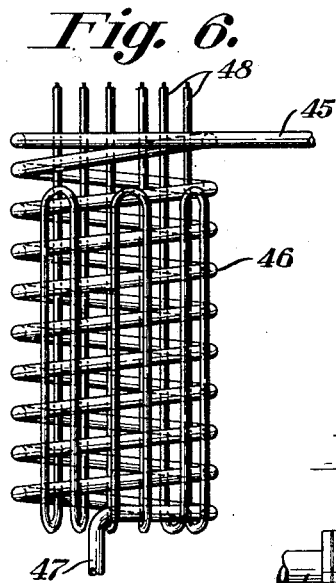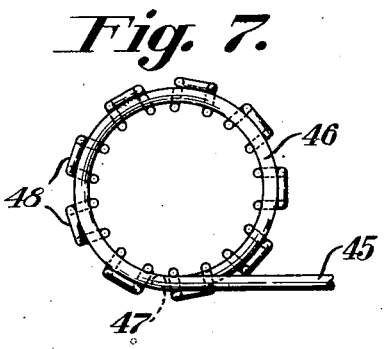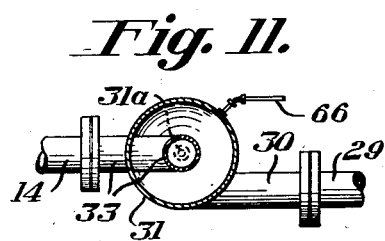

United States Patent Office 2,789,893
Patented Apr. 23, 1957

2,789,893

FLUID FOGGING SYSTEM

Hal B. Coats, Edgewood, Pa., assignor, by mesne assignments, to Blaw-Knox Company, Pittsburgh, Pa., a corporation of Delaware Application July 31, 1951, Serial No. 239,563

4 Claims. (Cl. 48—190)

This invention relates to a fluid fogging system for producing fogged gas utilizing a vaporizable liquid. More particularly, this invention relates to a process and apparatus wherein a vaporizable oil is rapidly vaporized in the presence of a gas and converted into persistent fog particles by contact with a relatively cooler gas, the resulting fogged gas being very advantageous for use in fuel gas systems and the like.

For example, the practice of introducing an oil fog in gas distribution piping systems is used to overcome the drying-out action of natural gas on the leathers in meters and regulators and in pipe joint packing, and to dampen and lay rust and dust deposits to prevent their producing "dust storms" in the system. These needs are especially apparent when an existing distribution system is changed over from manufactured fuel gas to natural gas, or when the manufactured gas is augmented with dry natural gas. It has also been found that odorants added to the gas are adsorbed in dry pipe line dust, but not in oil-moistened dust; and oil fogging is used to inhibit such adsorption and thus to cause the odorant introduced at a convenient source to reach the remote parts of the system. Hence in turning to natural gas use, the gas industry has heretofore adopted a number of measures to introduce oil fogs into gas distribution systems. One of these measures, for example, is to atomize liquid oil substantially directly into the fuel gas stream. However, such a practice is wasteful of oil and frequently fails to yield a sufficiently persistent quantity or quality of finely divided liquid particles for the purpose intended.

Another common practice heretofore used involved by-passing a portion of the gas stream through oil in a vessel heated generally by a gas burner. Such oil vapor as might be picked up in the by-passed gas was condensed to produce a fog. Such a practice gives rise to a number of difficulties and problems. One trouble encountered with such systems has been the breakdown of the oil on the directly heated surfaces, causing the build up of deposits of carbon on the heat transmitting surface which in turn reduces the thermal conductivity of the vessel surface and also requires frequent shutdowns for cleaning. Moreover, where gas heating of the vessel was employed the equipment usually had to be kept at a distance from the gas pipe lines and mains because of the explosion hazard. Further, even if a narrow distillation range oil were used, there was a disproportionate removal of the lower boiling point components changing the distillation range of the oil remaining in the vessel and involving non-uniformity of operation and inefficiency in the fogging operation. Another difficulty has been the inherent approximate methods for setting oil and gas rates, resulting in non-uniform control of the equipment and variability in the particle size.

In the new system of this invention, the foregoing difficulties have been overcome and a method and apparatus are provided by means of which a vaporizable liquid, such as oil, can be relatively quickly and substantially wholly vaporized without material chemical dissociation and over a wide range at precisely adjustable rates of flow. By electrically heating a mixture of vaporizable liquid and gas in adjusted proportions, I am able to obtain complete volatilization of all the oil in measured and controlled amounts using heat transfer surfaces substantially below a temperature which would cause decomposition of the oil, and at prevailing pipe-line pressures, which, as is well known, may be several atmospheres. This vapor is converted into relatively uniform and persistent fog particles by projecting it into relatively cooler gas, usually of the same composition as the first-mentioned gas, care being taken to avoid impingement of the vapor against any solid surface which would condense it into oversize liquid particles. As a consequence, relatively uniform particle production is assured which will persist and remain gas-borne when the fogged gas is returned to the gas pipe lines and mains.

The new apparatus is characterized by means for adjusting the rate of flow of oil and of gas in definite proportions which are automatically maintained constant even though there may be variations in the main line gas pressure, means for mixing measured proportions of oil and gas prior to heating to produce a wholly vapor-gas mixture in the heater and thus to effect complete vaporization of liquid generally below the end-point boiling temperature at the pressure involved, a substantially constant temperature heater for this oil-gas mixture having a cross section and length proportioned to provide high contact velocity and a high heat transfer rate for vaporizing the oil, and means for admitting the oil vapor to cold sweep gas for producing fog while preventing condensation on solid surfaces. Further, the new apparatus is safe and can be placed next to any gas line at the point where the new fogged gas is to be introduced. The new system is readily adapted to all types of gas systems whether high or low pressure systems.

Other objects and advantages of this invention will be apparent from the following description and from the drawings, which are schematic and illustrative only, in which Figure 1 is a flow diagram of one possible embodiment of the new system of this invention;

Figure 2 is a view in side elevation of an apparatus assembly embodying the new system which may be utilized as schematically shown in Figure 1;

Figure 3 is a plan view of the apparatus assembly shown in Figure 2;

Figure 4 is an end view from the rear of the heater unit assembly viewed from line IV—IV of Figure 2;

Figure 5 is a view in cross section of Figure 4 taken along line V—V of Figure 3;

Figure 6 is a detailed view of the heater pipe coil and electric heater rods in assembled relation before being embedded in a metal matrix;

Figure 7 is a plan view of the assembly shown in Figure 6;

Figure 8 is an enlarged view in cross section of a cold mixer included in the apparatus assembly of Figure 3, taken along line VIII—VIII of Figure 3;

Figure 9 is an enlarged view in section through the hot mixer in the apparatus assembly shown in Figure 2 taken along line IX—IX of Figure 2;

Figure 10 is a view in section taken along line X—X of Figure 9 with the broken-away portion restored;

Figure 11 is an enlarged view in cross section of a classifier shown in the apparatus assembly of Figure 2 taken along line XI—XI of Figure 2; and Figure 12 is a schematic sectional view of a pressure regulator valve of a type suitable for use in the new apparatus assembly of this invention.

Referring to the drawings, a gas distribution system, for example, may have a fuel gas pipe line or main 10 through which the fuel gas flows in the direction indicated by the arrows and have a reducing station or regulator valve 11 connected in the pipe 10 to control the pressure of the fuel gas in the pipe on the downstream side of the station or valve 11. A new apparatus assembly 12 made in accordance with the fluid fogging system of this invention may be provided adjacent the pipe line 10 and connected across any such installed reducing station or regulator valve 11 respectively by a take-off pipe 13 and a return pipe 14, suitable valves 15 and 16 being also provided. The pressure drop across the valve 11 may thus be conveniently used to cause a flow of gas through the fogging apparatus 12; but obviously any other expedient such as a blower could be alternatively provided for this purpose. The valves 15 and 16 are normally open. Apparatus assembly 12 comprises a unit on a base plate 17 which may be of channel section having corner angles 18 for support welded thereto. If desired, assembly 12 and its base 17 may be mounted on skids so that it can readily be moved from one location to any other location desired after being disconnected from the pipes 13 and 14 and its connections to electric power lines 19 and vaporizable liquid storage tank 20. A vaporizable liquid such as an oil of suitable composition may be purchased in a drum which may serve as storage tank 20 when mounted on a stand 21. A gauge glass 22 may be connected to tank 20 to indicate when replenishment is required.

In assembly 12 itself in the embodiment schematically shown in Figure 1 and more fully shown in Figures 2 and 3, the take-off pipe 13 is connected to a pipe section 23 the upstream or incoming end of which is supported on a structural bracket 24, a strap being generally used to secure pipe 23 to bracket 24. A branch 25 of the T-connection 23 is connected through a metering orifice 27 to a fogging gas pipe 26 by suitable flanges and fittings. Another orifice 28 is interposed between the respective flanges at the outlet end of the pipe section 23, connecting it to the sweep-gas pipe section 29. These metering orifices 27 and 28 proportion the flow of gas delivered through pipe 13 respectively into pipes 26 and 29 on the downstream sides of orifices 27 and 28. I call these two portions "fogging gas" and "sweep gas," the former being mixed with the vaporizable liquid prior to vaporization, and the latter being used to condense the vapor and to sweep the fog back to the pipe line. The downstream end of pipe 29 is connected to a tangential inlet 30 welded to the side of a closed classifier vessel 31 mounted on its base 32 which in turn is fastened to base 17 of assembly 12. Outlet pipe 33 of vessel 31 is connected to return pipe 14 so that the gas-borne fog particles can be introduced into the downstream side of pipe line 10 and distributed along many miles of the gas company pipe line and main system to achieve advantages enumerated above. A return pipe or drain 31a returns liquid from the bottom of classifier 31 directly to a sump to which a pump may be connected to return it to storage tank 20.

A diaphragm pressure regulator valve 13a is connected in take-off pipe 13 adjacent section 23. This valve may be of a conventional type provided with a diaphragm 13b one side of which communicates with the interior of vessel 31 by means of a pressure pipe connection 31b. The other side of diaphragm 13b communicates with the downstream side of pipe 13 by means of a pressure pipe connection 13c. The valve 13a which may be of the type schematically shown in Figure 12 is accordingly controlled so as to create a constant pressure differential between the tap of pipe 13c in pipe 13 and the tap of pipe 31b in vessel 31. The pressure at the tap of pipe 13c in pipe 13 is substantially the same pressure as the pressure in pipe 23 immediately in advance of the orifices 27 and 28 where the said tap may also be connected. Hence, irrespective of the gas pressure in main 10 on the upstream side of station or valve 11, or variations in the gas pressure on the downstream side of station or valve 11 in main 10, the volume of gas for given conditions passing through the sweep pipe section 29 and through the fogging gas pipe section 26 will remain generally constant and uniform.

Fogging gas flowing through pipe 26 enters a cold mixer 35 where it is admixed with a metered quantity of a vaporizable liquid such as oil from tank 20. This oil, in the exemplary apparatus illustrated, flows from the tank 20 through pipe 36 and filter 37 into a conventional pump 38 operatively connected to a prime mover 39 in the form of an electric motor deriving its power from the electric power lines 19. Pump 38 forces the oil under pressure through a pipe 40, T-fitting 41, valve 42, pipe 42a and an indicating meter 43 such as a conventional "Rotameter," into cold mixer 35 where it is sprayed by nozzle 35a and mixes with the fogging gas issuing from pipe 26.

A pipe 40a is connected to the branch outlet of T-fitting 41 and at its other end to tank 20 forming a return line for that portion of the vaporizable oil from pipe 40 which does not proceed through control valve 42. A pressure regulator valve 40b is connected in pipe 40a. Valve 40b is shown schematically in enlarged section in Figure 12. It includes a diaphragm chamber 100 the upper side of which is in communication through a pipe 101 and a tap 102 with the interior of cold mixer 35. The other side of diaphragm chamber 100 is subject to the pressure on the upstream side of pipe 40a through a pressure pipe 103. As shown, valve 40b may comprise a stem 104 connected at its upper end to the center of the diaphragm in chamber 100 and at its lower end to a valve disc 105 which coacts with a valve seat 106.

The valve includes a conventional adjustable spring 107 arranged to urge the valve stem 104 into valve-closing direction. The spring action is opposed by pressure admitted to the lower side of the diaphragm chamber through pipe 103, and is assisted by pressure admitted to the upper side of the diaphragm chamber through pipe 101. Spring 107 surrounds stem 104 and exerts a downward pressure on valve disc 105 by bearing against a suitably shouldered portion 109 on stem 104 urging disc 105 towards seat 106. An adjustment member 107a enables the spring pressure to be varied in accordance with the regulation need of the system. Hence, valve 40b for any particular setting of member 107a will maintain a generally constant pressure differential between the pressure in the interior of T-fitting 41 and the pressure in the interior of cold mixer 35 irrespective of the degree of opening of the valve 42 and irrespective of the absolute pressure within the apparatus. Thereby, by the regulation of valve 42 and its degree of opening a precise volume of oil in terms, for example, of gallons per hour may be established and maintained at the amount of oil desired to pass through nozzle 35a. Such a relatively precise control enables the ratio of the volume of vaporizable liquid such as oil passing through pipe 42a to the volume of gas passing into pipe section 23 to be preselected and maintained generally regardless of pressure and temperature changes in the gas main 10, or in the oil input pipe 36, or in the oil outlet pipe 40, or elsewhere.

The vaporizable oil and fogging gas coming together under pressure into cold mixer 35 are forced through an outlet pipe 44 into the entry end 45 of a heater pipe 46 which may be in the form of a helical coil having an outlet end 47. By having the outlet end 47 lower than the inlet end 45, the pipe 46 may readily be drained in case of shutdown.

The helical coil 46 is a part of a unique heater comprising that coil, a plurality of electric heater rods 48 and a block or matrix 50 of a preferably thermo-conductive metal such as aluminum. The block 50 is preferably cast on the coil 46 and the rods 48 so as to embed them therein and establish a continuous and uniform heat conducting medium to the entire exterior of the coil 46 from the exterior of the heater rods 48. The heater rods may be preliminarily assembled with the coil 46 as illustrated in Figures 6 and 7, the rods 48 being of generally hairpin shape and having a bend therein intermediate the ends of the hairpin shape within which the turns of coil 46 are disposed preferably in close juxtaposition thereto. This construction also permits the use of a minimum amount of aluminum in the block 50 so that the heat capacity of the block itself is not a material factor in the time required to bring the entire heater structure to a desired given temperature.

The metal block 50 may be conveniently cast around the coil 46 and heating elements 48 so as to provide a terminal box for electrical connections at the top, a supporting pedestal, and a thermometer well in an integral metal structure. In the example illustrated, a well 51 for the bulb of a temperature control instrument is constructed of pipe fitted to the mold for the casting, and an upwardly projecting metal cylinder 52 concentric with the casting 50, is located at the top of the mold. The inner cylindrical wall of the mold may also be a pedestal pipe 68. The ends 45 and 47 of the coil 46 extend through the mold. Fused aluminum or other suitable metal is then poured into the mold to cover the coil 46, encasing the coil and heater elements 48, and joining the turret 52, pedestal 68, and thermometer well 51 in an integral structure.

The terminal ends of the heaters 48 extend through the upper end of the block 50 into the cylinder 52, which latter is provided with a cover plate 53 and a laterally extending conduit 55 for the electrical cables 54, connected by the eye, stud and nut assemblies 56 to the respective heater rods 48. This terminal assembly can be readily constructed to accepted standards for explosion-proof electrical practice.

The insulated cables 54 extend through conduit 55 to a conventional electrical contactor 57 mounted on a panel 58 supported by uprights 59 and 60 which in turn are fastened to base 17. The panel 58 may also be provided with, in a conventional electric network, a circuit breaker 61, a motor starter 62 and a temperature controller 63 electrically connected in the control circuit of contactor 57. A thermometer bulb or a thermocouple junction positioned in well 51 is connected in any suitable manner to controller 63 and thus provides automatic temperature control within the pipe 46 for the vaporizable liquid and fogging gas continuously moving therethrough. A further electrical connection extends to motor 39. Pressure gauges 64 and 65 are respectively connected to pressure taps in vessel 31 and pipe 23 on the upstream side thereof by the pipes 66 and 67 respectively.

The lower end of pedestal pipe 68 is provided with a flange 69 which may be fastened on top of another flange 70 with an asbestos washer between the flanges through which bolts may be passed to connect the respective flanges together. Flange 70 is a part of a pedestal 71 which is welded or otherwise fastened rigidly to base 17.

The outlet end 47 of heater coil 46 is relatively short and is threaded for connection to a nozzle 72, which, as shown in Figure 10, may be welded to pipe 29 and because of the shortness of outlet 47 and nozzle 72 the vapor and fogging gas admixture discharging from coil 46 will be projected without material loss of heat in a downstream direction within pipe 29 and in a generally axial direction relative thereto. A hood 73 is fastened inside pipe 29 and shields nozzle 72 from direct impact with relatively cold sweep gas. The expansion which takes place in the course of the passage of the mixture of vaporizable liquid and through coil 46 as the mixture is heated and such liquid is changed into vapor results in the acceleration of the vapor and fogging gas towards nozzle 72, from which it issues at relatively high velocity even though nozzle 72 is not restricted in cross section. Hence such vapor and gas issues into the midst of and makes contact with the surrounding relatively cooler body of sweep gas constituting the balance of the gas entering pipe 23 from pipe 13 which is not diverted through pipe 26. Although in the embodiment illustrated, the sweep gas and the fogging gas respectively passing through the lines 23 and 26 are of the same composition, there may be instances in which wholly independent gases will be used for fogging gas and for sweep gas. In those cases, the pipe 26 will not embranch from pipe 23 but will be connected to the source of the independent gas used for fogging gas purposes.

The jetting action of the stream issuing from nozzle 72 surrounded as it will be by sweep gas on the downstream side of hood 73 results in the mixing of the hot vapor and fogging gas with the relatively cool sweep gas. Since the sweep gas substantially entirely surrounds the vapor being carried along, the formation of liquid particles from such vapor takes place substantially wholly in such gas in the form of minute particles. The velocity of sweep gas passing nozzle 72 is sufficient and the straight length of pipe 29 and the straight portion of inlet 30 in alignment therewith is long enough to minimize any material impingement of the vapor against the interior wall of the pipe 29 or 30 or the interior of vessel 31. Such impingement appears to condense the vapor into liquid phase droplets, as distinguished from fog particles, which are not colloidal and are less readily suspended in the gas. Similarly, the velocity of the sweep gas and of the mixed gaseous materials on the downstream side of nozzle 72 should not be so high as to carry the vapor from heater 46 into impingement with the inside of vessel 31 before it has had a chance to form suitable fog particles by contact with the relatively cooler sweep gas.

The fog entering classifier vessel 31 through inlet 30 is whirled around causing oversize droplets of the liquid to fall to the bottom of the vessel where it passes out through pipe 31a to a sump or to tank 20. There is usually sufficient pressure differential between the vessel 31, which is substantially at the pressure in gas main 10 on the downstream side from station or valve 11, and the sump or tank 20 which are generally at atmospheric pressure, to discharge any liquid trapped in the vessel 31 through the pipe 31a usually by, in such a case, opening a blow-down valve which may be installed in line 31a. The carrier fuel gas with the suspended fog particles therein from the vapor of the vaporizable liquid exit through outlet 33 and return pipe 14 for use in the gas company's transmission and/or distribution pipe system.

To conserve and maintain uniformity of temperature as well as to protect persons who may be working nearby, the heater casting 50 and the turret 52 may be entirely surrounded by a sheet metal cover 74, and the annular space between the cover and the heater may be filled with insulation material. Openings for the passage of conduit 55, inlet 45 and outlet 47 will be provided for in the construction of cover 74.

As an example of and not as a limitation upon the new system of this invention, it may be helpful to describe an apparatus assembly corresponding in principle to assembly 12 which was constructed to vaporize up to ten gallons of suitable oil per hour to supply fogged gas for a part of the system of a gas company. In that assembly unit, the overall dimension was approximately 5 feet in length by 2 feet in width by 5½ feet in height. The casting corresponding to casting 50 but excluding the cover and insulation had an outside diameter of 1 foot and a coil corresponding to coil 46 had a pitch diameter of 8¾ inches. The heater pipe was made of one-half inch seamless pipe and was approximately twenty feet long excluding the inlet and outlet ends which were each about one foot in length. The sweep pipe corresponding to pipe 29 was a standard three-inch pipe and had a length of about eighteen inches between the outlet of the heater pipe and the end of the entry pipe into the classifier corresponding to classifier 31. Tests were made in the aforesaid assembly unit, with the casting at about 650° F., in which results were obtained as follows:

| Upstream Gas Pressure | Downstream Gas Pressure | Observed Fogging Gas Rate | Observed Sweep Gas Rate | Oil Rate | Oil Pressure | Oil Differential Pressure | Percent Oil Converted to Fog |
|---|---|---|---|---|---|---|---|
| (13) | (14) | (28) | (29) | (42a) | (40) | (40-102) | |
| 49 | 41 | 125 | 2,090 | 1 | 120 | 79 | 97 |
| 52 | 41 | 1,250 | 20,750 | 10 | 128 | 87 | 95.5 |

All pressures in the above results are in terms of pounds per square inch, gauge; the gas rates are in cubic feet per hour corrected to 60° F. and atmospheric pressure; and the oil rate is in U. S. gallons per hour. The oil used was "Esso Mentor 28," a straight run product from paraffinic crude oil, and had the following typical analysis under atmospheric conditions:

A. P. I., gravity 40.1°
Open cup flash 275° F.
Saybolt Universal viscosity 40.7 sec. at 100° F.
Boiling range I. B. P. 500° F.; 10% 539° F.; 50% 570° F.; 90% 610° F.; E. P. 648° F.

In the test of this particular assembly in which, it will be noted, the downstream gas pressure below the regulator (corresponding to 11) in the gas main was about 41 p. s. i. g., it was determined that the sweep gas velocity in the pipe corresponding to pipe 29 should be at least about 200 linear feet per minute but should not exceed about 4300 feet per minute. If less than the lower velocity is used, some condensation occurred on the walls of the pipe 29; and if more than the maximum velocity were provided, uncondensed vapor would be discharged into the vessel 31 along with fog. Hence it appears that the sweep gas may be varied over a wide range without impairing the operation of the new system, but that such variation is not without limits. In the same manner it was further determined that the ratio of fogging gas to oil vapor in the coil 46 should not be less than about 125 cubic feet of gas for each U. S. gallon oil vaporized, using a heater temperature of about 650° and at about 40 p. s. i. g., to completely vaporize the oil. Increasing this ratio, which is the normal result of throttling the valve 42 to reduce the oil flow to mixer 35 without changing the gas flow, may be permitted without limit, as this merely lowers the partial pressure of the oil vapor in the vapor-gas mixture and permits vaporization of the liquid to be completed at even lower temperatures than the maintained temperature of about 650° at the 40 pound per square inch gauge pressure.

In another test of that particular assembly at a temperature of about 650° F., the following conditions were present: upstream gas pressure, 87 p. s. i. g.; downstream gas pressure, 83 p. s. i. g.; observed fogging gas rate, 905 standard cubic feet per hour; observed sweep gas rate, 14,500 standard cubic feet per hour; oil rate, 5 gallons per hour; oil pressure, 89 pounds per square inch, gauge; oil differential pressure 6 pounds per square inch between the pressure at the pump outlet and the pressure in the cold mixer 35. In this last-mentioned test, 95% of the vaporizable oil was converted into fog and the test demonstrates the low differential pressures which may exist which are ample for the operation of apparatus made in accordance with the new system and further demonstrates the wide range of pressures which may also exist without impairing the operating efficiency of the new system.

Various modifications may be made in the new system of this invention without departing from the spirit thereof or the scope of the appended claims.

I claim:

1. Apparatus for producing an oil fog in fuel gas under pressure in a gas distribution line adapted to be operated in a by-pass circuit around a pressure reducing restriction in such line, comprising, in combination, a gas regulator valve connected to said line above said restriction and a separating classifier vessel connected to said line below said restriction, a pipe conduit directly connecting said regulator valve and said vessel, an orifice and a vapor injecting nozzle respectively spaced from said valve and said vessel within said conduit, a second orifice connected in parallel with said first-mentioned orifice and extending from a position between the latter and said gas regulator valve, a flowing stream mixer and a pipe heater serially connected between said second-named orifice and said nozzle, pressure means for injecting a measured stream of vaporizable oil into said mixer, electrical heating means for maintaining said pipe heater at relatively constant elevated temperature to vaporize the oil, said nozzle extending from the discharge end of said pipe heater and projecting axially into said conduit towards said vessel, a shield in said conduit on the upstream side of said nozzle, and means connected to said separating classifier vessel responsive to the pressure therein for controlling the operation of said regulator valve.

2. Apparatus for producing an oil fog in fuel gas under pressure in a gas distributing line adapted to be operated on a by-pass circuit around a pressure reducing restriction in such line, comprising, in combination, a fog classifying vessel adapted to be connected to said line below said restriction, a gas conduit adapted to be connected between said vessel and the line above said restriction, a vapor injecting nozzle within said conduit axially directed towards said vessel, a sweep gas metering orifice upstream from said nozzle within said conduit, a fogging gas metering orifice connected to said conduit in parallel with said sweep gas conduit, a confined volume cold mixer and a pipe heater serially connected externally of said conduit between said fogging gas metering orifice and said nozzle, an oil pump, a pipe connecting the discharge side of said pump to said cold mixer, a manually adjustable control valve in said pipe, a return by-pass line connected to said pipe between said pump and said valve, a pressure regulator valve in said by-pass line, and a pressure pipe connection between the said cold mixer and said valve, whereby the volume of oil by-passed is regulated to maintain a relatively constant pressure drop in the oil line across said manually adjustable valve and cold mixer in series to hold the selected oil flow uniform substantially without regard to gas pressure in said line.

3. In a continuous fluid fogging process for gas systems or the like, the steps comprising, in combination, continuously diverting a portion of a flowing stream of gas from said system or the like, continuously dividing said diverted portion into a stream of fogging gas and a stream of sweep gas, continuously feeding said sweep gas without substantial heating thereof through a contact zone, continuously feeding said fogging gas into a mixing zone, continuously feeding under pressure a stream of vaporizable oil into said mixing zone to intermix with said stream of fogging gas, continuously passing the intermixed vaporizable oil and fogging gas from said mixing zone through a heating zone, externally heating said intermixed vaporizable liquid and fogging gas in said heating zone during its passage to vaporize substantially all of said vaporizable oil, continuously passing said heated intermixed vapor and fogging gas from said heating zone into said contact zone to contact said sweep gas substantially in the direction of movement of said sweep gas through said contact zone to form a total fog particle admixture, classifying said total admixture to remove any oversize fog particles therefrom, and introducing the balance of said total admixture into said gas system or the like at a lower pressure than the pressure of said diverted portion.

4. In a continuous fogging device for gas systems or the like, apparatus comprising, in combination, a take-off pipe for continuously diverting a portion of a main stream of gas flowing through said gas system or the like, a fogging gas pipe and a relatively straight sweep gas pipe, means for continuously dividing gas flowing through said take-off pipe into a fogging gas stream to pass through said fogging gas pipe and a sweep gas stream to pass through said sweep gas pipe, a vaporizable oil reservoir, a nozzle mixer connected to said fogging gas pipe such that said fogging gas flows continuously therethrough, means for pumping oil under pressure from said reservoir to said mixer in a continuous stream flowing therethrough, said fogging gas and vaporizable oil intermixing as they pass through said mixer, means for proportioning the quantity of fogging gas and vaporizable oil entering said mixer, a heater having a conduit therethrough connected to the outlet from said mixer to continuously receive the intermixed stream of fogging gas and vaporizable oil, said heater adapted to heat said intermixed stream of fogging gas and vaporizable oil to convert said oil into vapor admixed with said fogging gas, a discharge nozzle connected to said heater to discharge the admixture of oil vapor and fogging gas into sweep gas flowing through said sweep gas pipe generally in the direction of movement of said sweep gas to form a total admixture with fog particles therein, a cylindrical vessel tangentially connected to said sweep gas pipe, and a return pipe connected to a gaseous outlet from said vessel to return the diverted portion of said gas with fog particles therein to the main stream of gas in said gas system or the like.

References Cited in the file of this patent
UNITED STATES PATENTS

| | | |
|---|---|---|
| 1,162,537 | Yager | Nov. 30, 1915 |
| 1,534,290 | Udale | Apr. 21, 1925 |
| 1,542,823 | Manville | June 23, 1925 |
| 1,544,159 | Jento | June 30, 1925 |
| 1,798,161 | Kirby | Mar. 31, 1931 |
| 1,906,145 | Evans | Apr. 25, 1933 |
| 1,932,537 | Straight | Oct. 31, 1933 |
| 1,993,311 | Shively | Mar. 5, 1935 |
| 1,993,315 | Blackwood | Mar. 5, 1935 |
| 1,993,316 | Blackwood et al. | Mar. 5, 1935 |
| 2,067,454 | Markle | Jan. 12, 1937 |
| 2,116,896 | Hudson | May 10, 1938 |
| 2,145,287 | Beyrodt | Jan. 31, 1939 |
| 2,247,816 | McIlrath | July 1, 1941 |
| 2,343,488 | Thomas | Mar. 7, 1944 |
| 2,460,528 | Oswald | Feb. 1, 1949 |

FOREIGN PATENTS

| | | |
|---|---|---|
| 553,423 | Germany | Sept. 2, 1931 |